(12) United States Patent
Ono et al.

(10) Patent No.: US 6,708,366 B2
(45) Date of Patent: Mar. 23, 2004

(54) GROMMET

(75) Inventors: Shuji Ono, Shizuoka (JP); Hiroki Goto, Shizuoka (JP); Masao Sakai, Aichi (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/757,495

(22) Filed: Jan. 11, 2001

(65) Prior Publication Data

US 2001/0044984 A1 Nov. 29, 2001

(30) Foreign Application Priority Data

Jan. 11, 2000 (JP) ..................................... P2000-002731
Jan. 11, 2000 (JP) ..................................... P2000-002781

(51) Int. Cl.$^7$ ............................. F16L 5/00; H01R 13/58
(52) U.S. Cl. ................................. 16/2.5; 16/2.1; 16/2.2; 174/153 G
(58) Field of Search ........................... 16/2.1, 2.2, 2.5; 174/153 G, 152 G, 65 G

(56) References Cited

U.S. PATENT DOCUMENTS

| | | | | |
|---|---|---|---|---|
| 5,499,823 A | * | 3/1996 | Fukui | 277/314 |
| 5,639,993 A | * | 6/1997 | Ideno et al. | 174/153 G |
| 5,774,934 A | * | 7/1998 | Fujita et al. | 16/2.1 |
| 5,856,635 A | * | 1/1999 | Fujisawa et al. | 174/153 G |
| 6,058,562 A | * | 5/2000 | Satou et al. | 16/2.1 |
| 6,088,875 A | * | 7/2000 | Ono et al. | 16/2.2 |
| 6,240,597 B1 | * | 6/2001 | Mochizuki | 16/2.1 |

FOREIGN PATENT DOCUMENTS

| | | | |
|---|---|---|---|
| GB | 2 289 104 A | 11/1995 | |
| GB | 2 337 642 A | 11/1999 | |
| GB | 2 338 613 A | 12/1999 | |
| JP | 8-212857 | 8/1996 | ........... H01B/17/58 |
| JP | 11-341650 | 12/1999 | |

\* cited by examiner

*Primary Examiner*—Anthony Knight
*Assistant Examiner*—Michael J. Kyle
(74) *Attorney, Agent, or Firm*—Sughrue Mion, PLLC

(57) ABSTRACT

A grommet includes a first cylindrical portion 21 for passing a wire harness therethrough, a second cylindrical portion 22 for fitting in a mounting hole 12 in a panel 11, and a connecting portion 23 interconnecting the first and second cylindrical portions 21 and 22. The second cylindrical portion 22 is turned inside out, and flange portions 25, formed on the second cylindrical portion 22, are passed through the mounting hole 12. Subsequently, the second cylindrical portion 22 is restored into its initial shape by its own restoring force, thereby mounting the grommet in a predetermined position. Ribs 30 are formed on an inner peripheral surface of the connecting portion 30, and the position of folding of the connecting portion 23 is determined by these ribs, thereby preventing the grommet from being excessively reversed, and by doing so, the restoration of the grommet into its initial shape can be easily started.

3 Claims, 6 Drawing Sheets

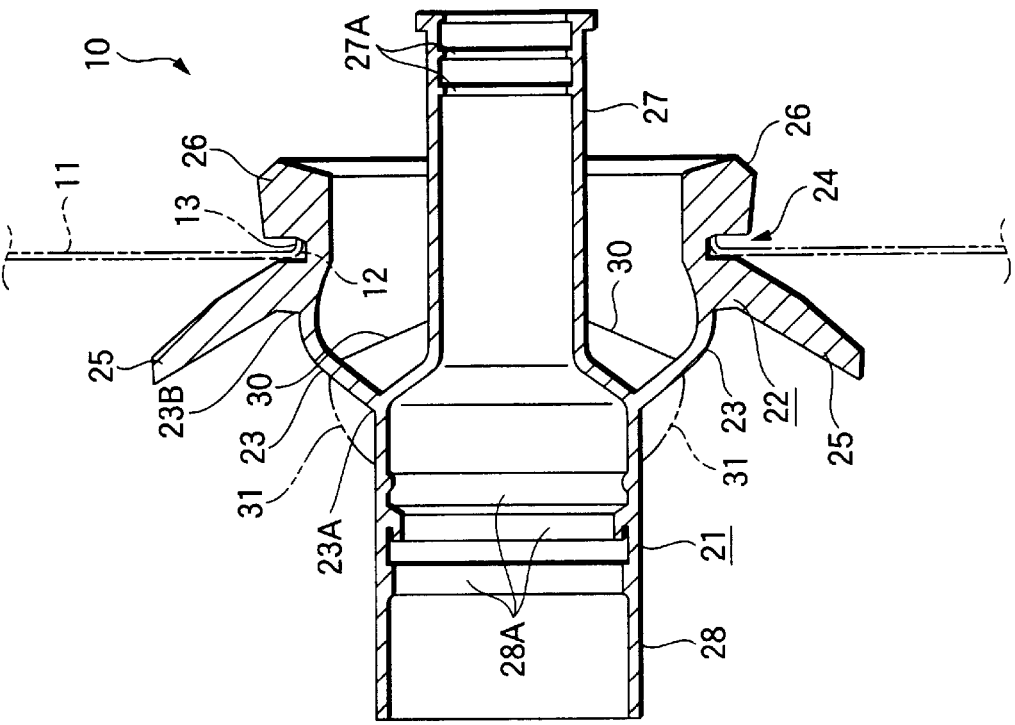
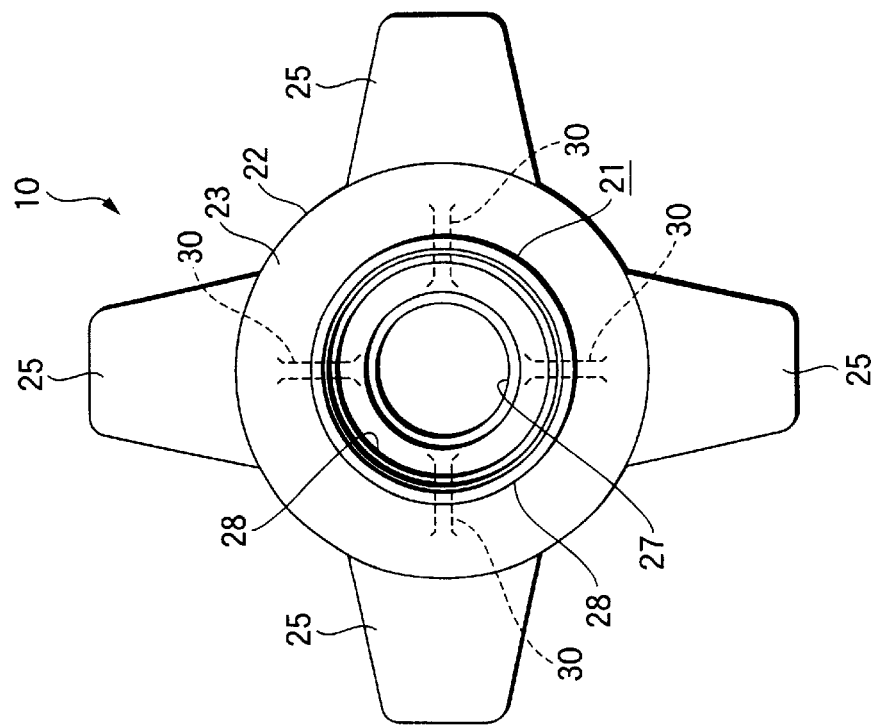

GROMMET

BACKGROUND OF INVENTION

1. Field of Invention

This invention relates to a grommet, and more particularly to a grommet which enables an elongate member (e.g. a wire harness) to be positively and easily passed through and held on a mounting plate such as a vehicle body panel.

2. Related Art

There have heretofore been proposed various grommets for mounting a wire harness on a vehicle body panel of an automobile in such a manner that the wire harness passes through the vehicle body panel.

In a conventional art of JP-A-8-212857, a grommet includes a smaller-diameter tubular portion for fitting on a wire harness, a larger-diameter tubular portion for fitting in a mounting hole in a vehicle body panel, a tapering tubular portion interconnecting the smaller-diameter tubular portion and the larger-diameter tubular portion, a fitting groove formed in an outer peripheral surface of the larger-diameter tubular portion, and holding piece portions formed on the outer peripheral surface of the larger-diameter tubular portion.

In this conventional construction, first, the wire harness is fitted in the smaller-diameter tubular portion, and in this condition that portion of the grommet, including the tapering tubular portion and the larger-diameter portion, is reversed or turned (in one longitudinal direction) inside out at a smaller-diameter end of the tapering tubular portion, and is fitted on the smaller-diameter tubular portion, so that the holding piece portions are disposed radially inwardly of the fitting groove.

Then, the wire harness is pushed to be passed through the mounting hole in the panel, so that distal end portions of the holding piece portions are inserted into the mounting hole in the panel, with the reversed larger-diameter tubular portion held against a surface of that portion of the panel disposed around the peripheral edge of the mounting hole. Then, the wire harness is further pushed in the one direction so as to cause the grommet to produce its own restoring force, so that the tapering tubular portion and the larger-diameter tubular portion are restored into their respective initial shapes, and at the same time the fitting groove is fitted on the peripheral edge of the mounting hole.

Further, in this conventional construction, the wire harness can be mounted in the mounting hole in a panel according to the following procedure. First, the smaller-diameter tubular portion is fitted on the outer periphery of the wire harness, and in this condition that portion of the grommet, including the tapering tubular portion and the larger-diameter portion, is reversed or turned (in one longitudinal direction of the wire harness) inside out, and is fitted on the smaller-diameter tubular portion, so that the holding piece portions are disposed radially inwardly of the fitting groove, and also the fitting groove and the holding piece portions are directed toward one side portion of the wire harness. Then, that portion of the wire harness, extending from the grommet in the one direction, is passed through the mounting hole in the panel, and is pulled, thereby inserting the distal end portions of the holding piece portions into the mounting hole, so that the reversed larger-diameter tubular portion is abutted against a surface of that portion of the panel disposed around the peripheral edge of the mounting hole. Then, the wire harness is further pulled in the one direction so as to cause the grommet to produce its own restoring force, so that the tapering tubular portion and the larger-diameter tubular portion are restored into their respective proper initial shapes, and at the same time the holding piece portions are turned in sliding contact with the peripheral edge of the mounting hole, so that the fitting groove is fitted on the peripheral edge of the mounting hole by this guiding action of the holding piece portions. Therefore, the wire harness can be easily and positively mounted in the mounting hole through the grommet with a small force.

In the above conventional construction, the reversed portion must be restored into the initial shape by further pushing the wire harness through the mounting hole until the restoring force is produced after the larger-diameter portion abuts against the panel surface.

In the above conventional construction, however, the tapering tubular portion and the larger-diameter tubular portion are turned inside out at the smaller-diameter end (i.e., proximal end) of the tapering tubular portion, and therefore there has been encountered a problem that the restoring action into the initial shape is large, so that it is difficult to smoothly fit the grommet in the mounting hole.

With respect to grommets of the ordinary type which are not reversed before mounting on the panel, there have been proposed the type of grommets having additional passage hole or holes for passing cables or hoses other than a wire harness.

With respect to the grommet of the above-mentioned type designed to be reversed before mounting on the panel, the larger-diameter portion is reversed, and therefore there has not heretofore been provided such grommet capable of passing a cable, a hose or the like in addition to the wire harness.

SUMMARY OF INVENTION

This invention has been made in view of the above problem, and an object of the invention is to provide a grommet which enables an elongate member (e.g. a wire harness) to be easily and positively mounted on a mounting plate, such as a vehicle body panel, in such a manner that the elongate member passes through the mounting plate.

Another object of the invention is to provide a reversal-type grommet capable of additionally passing a cable, a hose or the like other than a wire harness.

The above object has been achieved by a grommet for enabling an elongate member to be passed through and held relative to a mounting hole formed in a mounting plate, including a first cylindrical portion for passing the elongate member therethrough, a generally-conical, annular connecting portion formed on an outer peripheral surface of the first cylindrical portion, a second cylindrical portion connected to the first cylindrical portion through the connecting portion, a groove formed in an outer peripheral surface of the second cylindrical portion, and a flange portion formed on that portion of the outer peripheral surface of the second cylindrical portion lying between the groove and the connecting portion; wherein the second cylindrical portion is turned inside out, with an inner peripheral surface thereof exposed outwardly, and a peripheral edge of the flange portion is inserted into the mounting hole, and subsequently the second cylindrical portion is restored into its initial shape, thereby passing the first cylindrical portion through the mounting hole, and also fitting the groove on a peripheral edge of the mounting hole; provided in that a rib is formed along a generatrix of the connecting portion, and extends continuously from a smaller-diameter end of the connecting portion toward a larger-diameter end thereof to a predetermined position.

The first cylindrical portion has the inner diameter corresponding to the outer diameter of the elongate member (such as a wire harness), or may have the slightly-smaller inner diameter so that the elongate member can be press-fitted into the first cylindrical portion. This first cylindrical portion does not need to have the uniform inner diameter or the uniform outer diameter throughout the length thereof, but may have a stepped cylindrical shape or a tapering cylindrical shape.

The second cylindrical portion has the outer diameter corresponding to the inner diameter of the mounting hole, and is connected at its proximal end to the peripheral edge of the connecting portion.

Therefore, the first and second cylindrical portions may be arranged, for example, in a telescopic manner, or may be connected together along the axis through the connecting portion.

The first cylindrical portion, the connecting portion and the second cylindrical portion may be formed integrally with one another, using a synthetic resin having suitable elasticity and water-resistance. However, these portions may be separate in so far as the second cylindrical portion has suitable elasticity and water-resistance.

The flange portion may comprise an annular flange formed continuously on the outer peripheral surface of the second cylindrical portion over the entire circumference thereof, or may comprise a plurality of flange portions formed at predetermined intervals in the circumferential direction.

The flange portion can be made larger in thickness than the second cylindrical portion, and can have a predetermined metal plate insert-molded therein.

The connecting portion has a generally conical, annular shape, and therefore the generatrix of the connecting portion means a line at which a plane, including the axis of the cone, intersects the conical surface. The rib is formed along this generatrix, and therefore the rib lies in the plane including the axis of the cone.

In the grommet of this construction, the rib extends continuously from the smaller-diameter end of the connecting portion toward the larger-diameter end thereof to the predetermined position, and therefore the position, at which the connecting portion is folded, is determined by this rib. Namely, the connecting portion is less liable to be folded at the region where the rib is provided, and when the second cylindrical portion is reversed or turned inside out, the connecting portion will not be folded at the proximal end thereof, but is folded at that portion thereof (intermediate the opposite ends thereof) near to the second cylindrical portion. Therefore, although the grommet is turned inside out over an area, including the second cylindrical portion and part of the connecting portion, the grommet is not turned inside out over an excessively-large area (that is, not reversed excessively), but is turned inside out over a smaller area, and is kept in a configuration analogous to the configuration which the grommet assumes immediately before the grommet begins to be restored into its initial shape by its own restoring force. Therefore, in the next step, when the second cylindrical portion is pressed against the panel surface, thereby imparting a restoring force to the grommet so as to restore the same into its initial shape, the restoration of the grommet can be immediately started, and therefore the fitting of the grommet can be effected smoothly.

Thus, the above-mentioned object is achieved.

The rib is formed respectively along the generatrix of the connecting portion, and therefore the connecting portion will be twisted even when a tensile force or a compressive force acts on the rib during the reversing operation.

In the present invention, the first cylindrical portion is disposed within the second cylindrical portion, and the rib is formed on an inner peripheral surface of the connecting portion, and is connected to the outer peripheral surface of the first cylindrical portion.

In this grommet, the rib extends between the inner peripheral surface of the connecting portion and the outer peripheral surface of the first cylindrical portion, and hence is not exposed to the exterior. Therefore, for example, when mounting the grommet in the mounting hole in the panel, the rib will not interfere with other portion, and hence will not hinder this operation. When the grommet is turned inside out, the position, at which the connecting portion is reversed or folded, is determined by the tension of the rib, and therefore the effect of determining the position of reversal or folding of the connecting portion can be fully achieved without the need for increasing the thickness of the rib.

Incidentally, even when the rib is formed on the outer peripheral surface of the connecting portion, the effect of determining the position of folding of the connecting portion by the rib can be achieved. In this case, however, the rib would be somewhat buckled by a compressive force unless the thickness of the rib is increased. Therefore, it is preferred that the rib be formed on the outer peripheral surface of the connecting portion as described above.

In the present invention, there are provided a plurality of ribs, and the plurality of ribs are arranged radially with respect to the axis of the connecting portion.

In this grommet, the plurality of ribs are arranged radially with respect to the axis of the connecting portion, and therefore when the grommet is turned inside out, the connecting portion can be folded or bent uniformly over the entire circumference thereof. Namely, the folded portion of the connecting portion can be disposed generally in a common plane, perpendicular to the axis thereof, over the entire circumference thereof. Therefore, the uniformly-reversed condition of the connecting portion can be achieved over the entire circumference thereof, and the whole of the reversed portion of the connecting portion 23 can be restored at a time over the entire circumference, thereby fitting the grommet into the mounting hole.

The above object has been achieved by a grommet for enabling an elongate member to be passed through and held relative to a mounting hole formed in a mounting plate, including a first cylindrical portion for passing the elongate member therethrough, a generally-conical connecting portion formed on an outer peripheral surface of the first cylindrical portion, a second cylindrical portion connected to the first cylindrical portion through the connecting portion, and a groove formed in an outer peripheral surface of the second cylindrical portion; wherein the second cylindrical portion is turned inside out, with an inner peripheral surface thereof exposed outwardly, and subsequently the second cylindrical portion is restored into its initial shape, thereby passing the first cylindrical portion through the mounting hole, and also fitting the groove on a peripheral edge of the mounting hole; provided in that there is provided a tubular passage portion which communicates the inside and outside of the connecting portion with each other, and projects outwardly from an outer peripheral surface of the connecting portion, and an axis of the passage portion extends along a generatrix of the outer periphery of the first cylindrical portion.

The first cylindrical portion has the inner diameter corresponding to the outer diameter of the elongate member (such as a wire harness), or may have the slightly-smaller inner diameter so that the elongate member can be press-fitted into the first cylindrical portion. This first cylindrical portion does not need to have the uniform inner diameter or the uniform outer diameter throughout the length thereof, but may have a stepped cylindrical shape or a tapering cylindrical shape.

The second cylindrical portion has the outer diameter corresponding to the inner diameter of the mounting hole, and is connected at its proximal end to the peripheral edge of the connecting portion.

Therefore, the first and second cylindrical portions may be arranged, for example, in a telescopic manner, or may be connected together along the axis through the connecting portion.

The first cylindrical portion, the connecting portion and the second cylindrical portion may be formed integrally with one another, using a synthetic resin having suitable elasticity and water-resistance. However, these portions may be separate in so far as the second cylindrical portion has suitable elasticity and water-resistance.

In the grommet of the invention, a flange portion may be formed on the second cylindrical portion. The flange portion may comprise an annular flange formed continuously on the outer peripheral surface of the second cylindrical portion over the entire circumference thereof, or may comprise a plurality of flange portions formed at predetermined intervals in the circumferential direction.

The flange portion can be made larger in thickness than the second cylindrical portion, and can have a predetermined metal plate insert-molded therein.

The passage portion can have a tubular shape of a desired cross-section having opposite open ends, or can have an end cap formed at a distal end thereof, so that it has a so-called closed-bottom tubular shape. In the case where the tubular passage portion has the end cap, the end cap is cut off or incised if necessary. A plurality of such passage portions may be provided.

The grommet of this construction has the tubular passage portion in addition to the first cylindrical portion for passing the elongate member (such as a wire harness) therethrough, and this tubular passage portion extends outwardly from the outer peripheral surface of the connecting portion interconnecting the first and second cylindrical portions. Therefore, an additional elongate member, such as a cable and a hose, can be passed through this passage portion. And besides, the passage portion is in the form of an independent tubular portion, and the axis of the passage portion extends along a generatrix of the outer periphery of the first cylindrical portion. Therefore, when the second cylindrical portion is reversed or turned inside out to be fitted over the first cylindrical portion, the second cylindrical portion will not interfere with the passage portion and the cable or the like, passing through this passage portion, and therefore the second cylindrical portion can be positively reversed. The passage portion is in the form of an independent tubular portion, and therefore in the reversed condition of the second cylindrical portion, the cable or the like can be passed through the passage portion from the rear side.

In the present invention, a plurality of guide portions project radially outwardly from the outer peripheral surface of the first cylindrical portion with respect to an axis of the first cylindrical portion, and can contact the peripheral edge of the mounting hole in an inscribed manner, and one of the guide portions is formed on an outer peripheral surface of the passage portion, and extends along this passage portion.

The grommet of this construction has the guide portions which can contact the peripheral edge of the mounting hole in an inscribed manner, and therefore when the end portion of the grommet is inserted into the mounting hole while guiding the grommet by the guide portions, the first cylindrical portion can be inserted into the mounting hole in such a manner that the first cylindrical portion is automatically brought into alignment with the mounting hole. In this case, one of the guide portions is formed on the outer peripheral surface of the passage portion, and extends therealong, and therefore the passage portion is reinforced. And besides, since the guide portion and the passage portion do not need to be provided separately from each other, the arrangement of the two can be easily effected.

BRIEF DESCRIPTION OF DRAWINGS

FIG. 1A is a plan view of a first embodiment of the present invention, and FIG. 1B is a cross-sectional view thereof;

DETAILED DESCRIPTION OF PREFERRED EMBODIMENTS

A preferred embodiment of the present invention will now be described in detail with reference to the drawings.

First Embodiment

Figure 2:
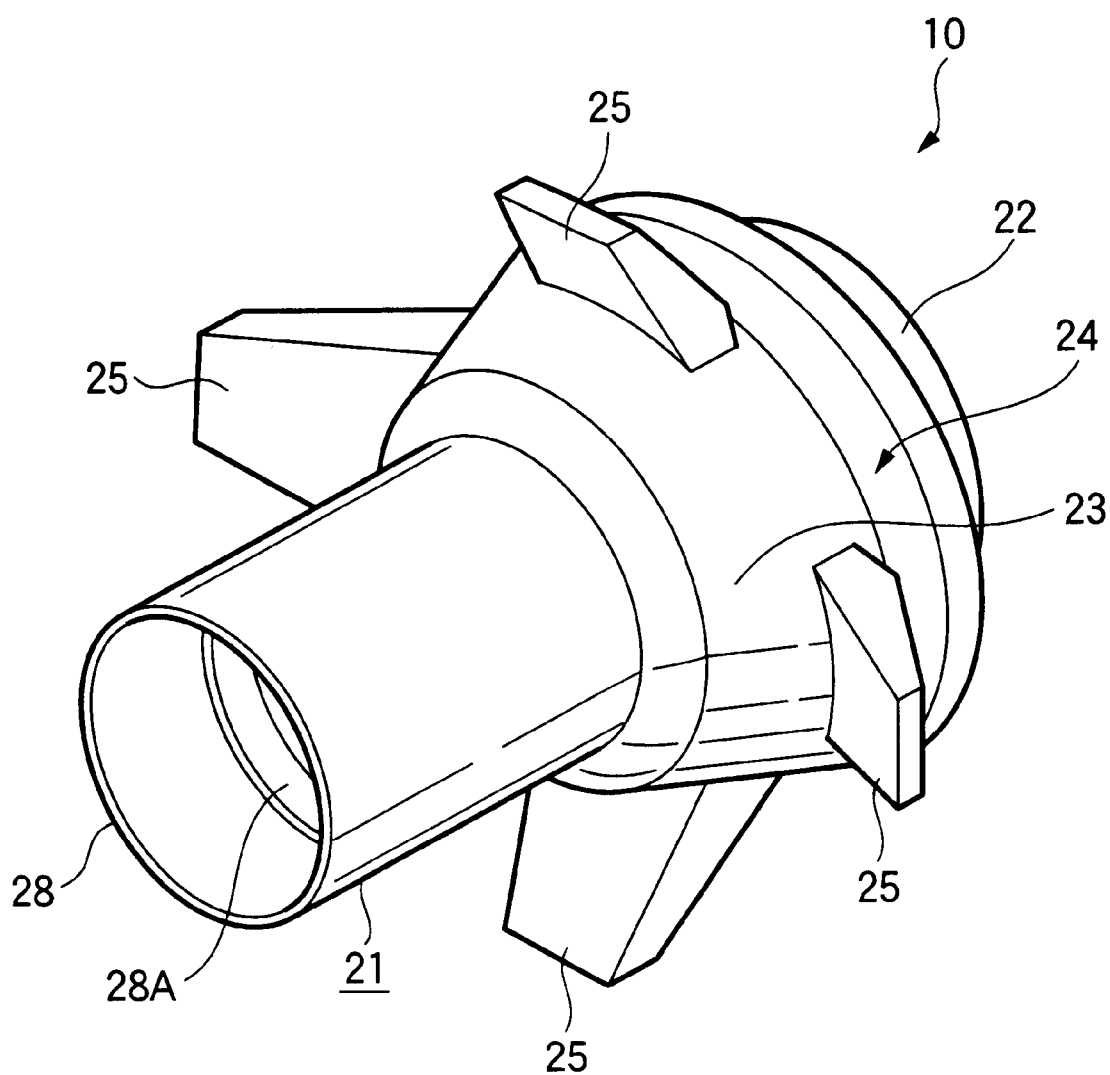
FIG. 2 is a perspective view showing the whole of a grommet of FIG. 1.

As shown in FIGS. 1 and 2, a grommet 10 of this embodiment is provided for mounting a wire harness (not shown) on a vehicle body panel 11 of an automobile in such a manner that the wire harness passes through the vehicle body panel 11, and this grommet can be fitted in a mounting hole 12, formed through the vehicle body panel 11, in such a manner that the wire harness is passed through and held relative to the mounting hole 12. The mounting hole 12 has a circular shape, and a flange 13 of a predetermined height is formed at a peripheral edge of the mounting hole 12 over an entire circumference thereof.

The grommet 10 includes a first cylindrical portion 21 for passing the wire harness therethrough, a generally-conical, annular connecting portion 23 formed on an outer peripheral surface of the first cylindrical portion 21, a second cylindrical portion 22 connected to the first cylindrical portion 21 through the connecting portion 23, a groove 24 formed in an outer peripheral surface of the second cylindrical portion 22 over an entire circumference thereof, flange portions 25 formed on that portion of the outer peripheral surface of the second cylindrical portion 22 lying between the groove 24 and the connecting portion 23, an engagement portion 26 formed on the outer peripheral surface of the second cylindrical portion 22 and extending from the groove 24 toward an open end of the second cylindrical portion 22, and ribs 30 formed respectively along generatrices of the connecting portion 23.

The grommet 10 is made of a synthetic resin having suitable elasticity and water-resistance, and the first and second cylindrical portions 21 and 22 are formed integrally with each other.

The first cylindrical portion 21 has a stepped configuration such that it has a smaller-diameter portion 27 and a larger-diameter portion 28 formed in continuous relation to each other along a common axis.

The smaller-diameter portion 27 has an inner diameter corresponding to an outer diameter of the wire harness, and annular ribs 27A are formed on an inner peripheral surface of the smaller-diameter portion 27.

When the wire harness is press-fitted into the smaller-diameter portion 27, the ribs 27A are elastically deformed to be held in intimate contact with the outer peripheral surface of the wire harness, so that the smaller-diameter portion 27 holds the wire harness in an air-tight manner.

The larger-diameter portion 28 has an inner diameter larger than the inner diameter of the smaller-diameter portion 27, and a plurality of annular ribs 28A are formed on an inner peripheral surface of the larger-diameter portion 28.

After the wire harness is press-fitted into the grommet, a predetermined filling material is filled in the larger-diameter portion 28, and is solidified, so that the larger-diameter portion 28 holds the wire harness in an air-tight manner.

The connecting portion 23 has a generally-conical, annular shape, and spreads or flares from the boundary portion between the smaller-diameter portion 27 and the larger-diameter portion 28 toward an open end of the smaller-diameter portion 27.

The second cylindrical portion 22 has an outer diameter corresponding to the diameter of the mounting hole 12, and also has an inner diameter larger than the outer diameter of the smaller-diameter portion 27. This second cylindrical portion 22 is connected to the connecting portion 23. Therefore, this second cylindrical portion 22 is arranged in generally-telescopic relation to the smaller-diameter portion 27 such that the smaller-diameter portion 27 is received in the second cylindrical portion 22, with a predetermined space formed therebetween.

The groove 24 has a generally channel-shaped cross-section, and the flange 13, formed at the peripheral edge of the mounting hole 12, can be fitted in this groove 24. The groove 24 is formed continuously in the circumferential direction perpendicular to the axis of the second cylindrical portion 22.

The flange portions 25 are disposed adjacent to the groove 24, and have such a configuration as obtained by dividing a disk, disposed perpendicular to the axis of the second cylindrical portion 22, into four sections. These flange portions 25 are circumferentially spaced about 90 degrees from one anther, and extend radially outwardly from the second cylindrical portion 22.

The ribs 30 are connected between the inner peripheral surface of the connecting portion 23 and the outer peripheral surface of the smaller-diameter portion 27 of the first cylindrical portion 21. The four ribs 30 are disposed radially with respect to the axis of the connecting portion 23. The ribs 30 are formed respectively along generatrices of the connecting portion 23 of a generally conical, annular shape, and extend continuously from a smaller-diameter end 23A of the connecting portion 23 toward a larger-diameter end 23B thereof to a predetermined position. In this case, the ribs 23 are disposed respectively at the same positions as those of the four flange portions 25.

Next, a procedure of installing the wire harness, using the grommet 10, will be described.

First, the wire harness (not shown) is passed through the first cylindrical portion 21 of the grommet 10, and the predetermined filling material is filled in the larger-diameter portion 28, and is solidified.

Figure 3:
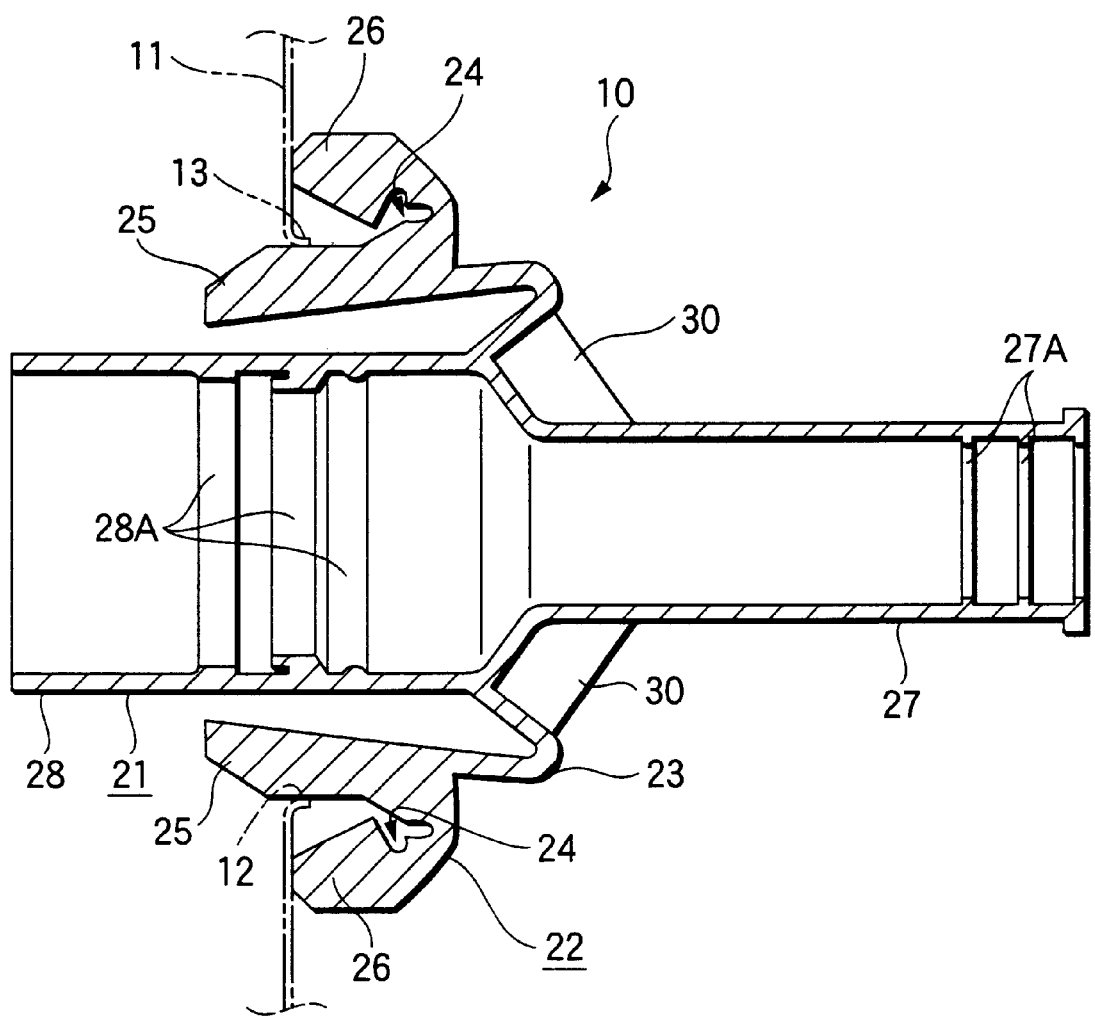
FIG. 3 is a cross-sectional view of the grommet of FIG. 1 in its reversed condition.

Then, as shown in FIG. 3, the second cylindrical portion 22 is turned or reversed toward the larger-diameter portion 28 of the first cylindrical portion 21, and therefore is turned inside out, with the inner peripheral surface of the second cylindrical portion 22 exposed outwardly.

At this time, when the second cylindrical portion 22 is reversed, the connecting portion 23 is bent or folded back at a suitable portion thereof, so that the second cylindrical portion 22 is turned inside out. However, the ribs 30 are formed on the inner peripheral surface of the connecting portion 23, and extend continuously from the smaller-diameter end 23A thereof toward the larger-diameter end 23B thereof to the predetermined position, and therefore the position, at which the connecting portion 23 is folded, is determined by the ribs 30. Namely, the connecting portion 23 is less liable to be folded at the region where the ribs 30 are provided, and therefore the connecting portion 23 will not be folded at the proximal end thereof in contrast with the conventional construction, but is folded at the region where the ribs 30 terminate, that is, at that portion of the connecting portion 23 (intermediate the opposite ends thereof) near to the second cylindrical portion 22.

Therefore, although the grommet is turned inside out over an area, including the second cylindrical portion 22 and part of the connecting portion 23, by the reversing operation, the grommet is not turned inside out over an excessively-large area (that is, not reversed excessively) in contrast with the conventional construction, but is turned inside out over a smaller area, and is kept in a configuration analogous to the configuration which the grommet 10 assumes immediately before the grommet begins to be restored into its initial shape by its own restoring force. In this reversed condition, the flange portions 25 are disposed radially inwardly of the groove 24.

Then, in this condition, the grommet 10 is arranged in such a manner that the second cylindrical portion 22 covers the flange 13 formed at the peripheral edge of the mounting hole 12, and then the wire harness, passing through the mounting hole 12, is pushed, thereby pushing the larger-diameter portion 28 of the first cylindrical portion 21 into the mounting hole 21. At this time, the wire harness will not be displaced relative to the first cylindrical portion 21 upon pushing the wire harness in a left-hand direction (FIG. 3) since the wire harness is held by the first cylindrical portion 21 through the filling material.

When the larger-diameter portion 28 of the first cylindrical portion 21 is thus pushed into the mounting hole 21, the peripheral edges (distal ends) of the flange portions 25 on the reversed second cylindrical portion 22 are inserted into the mounting hole 12, and the engagement portion 26, disposed radially outwardly of the flange portions 25 through the groove portion 24, abuts against that portion of the panel 11 around the peripheral edge of the mounting hole 12. FIG. 3 shows this condition.

Then, when the wire harness is further pushed in the left-hand direction in the drawings, the second cylindrical portion 22 is turned outwardly (that is, in such a direction as to be restored into its initial condition) about the distal end of the engagement portion 26 abutted against the vehicle body panel 11. When this turning movement exceeds a critical point, the grommet 10 itself begins to produce its restoring force, and the second cylindrical portion 22 and the connecting portion 23 tend to be restored into their respective initial shapes by themselves, and the flange portions 25 are turned in sliding contact with the peripheral edge of the mounting hole 12, and because of a guiding action of the turning flange portions 25, the groove 24 is fitted on the peripheral edge of the mounting hole 12.

In this sequential operation, when the second cylindrical portion 22 of the grommet 10 is first reversed, the second cylindrical portion 22 and the connecting portion 23 are turned inside out over the small area, and the grommet 10 is kept in the condition obtained immediately before the grommet begins to be restored into its initial shape by its own restoring force. Therefore, in the next step, when the engagement portion 26 of the second cylindrical portion 22 is pressed against the panel 11, thereby imparting a restoring force to the grommet 10 so as to restore the same into its initial shape, the restoration of the grommet 10 can be immediately started. Therefore, the wire harness can be easily and smoothly mounted in the mounting hole 12 through the grommet 10 with the small force.

With respect to another effect, the ribs 30 are formed respectively along generatrices of the connecting portion 23, and therefore the connecting portion 23 will be twisted even when a tensile force acts on the ribs 30 during the reversing operation.

The ribs 30 extend between the inner peripheral surface of the connecting portion 23 and the outer peripheral surface of the smaller-diameter portion 27 of the first cylindrical portion 21, and hence are not exposed to the exterior. Therefore, for example, when mounting the grommet 10 in the mounting hole 12 in the panel 11, the ribs 30 will not interfere with other portion, and hence will not hinder this operation. When the grommet 10 is turned inside out, the position, at which the connecting portion 23 is reversed or folded, is determined by the tension of the ribs 30, and therefore in contrast with the case where such folded portion is determined by a compressive force, the effect of determining the position of reversal or folding of the connecting portion 23 can be fully achieved without the need for increasing the thickness of the ribs 30.

The four ribs 30 are arranged radially with respect to the axis of the connecting portion 23, and therefore when the grommet 10 is turned inside out, the connecting portion 23 can be folded or bent uniformly over the entire circumference thereof. Therefore, the folded portion of the connecting portion 23 can be disposed generally in a common plane, perpendicular to the axis thereof, over the entire circumference thereof, and therefore the uniformly-reversed condition of the connecting portion 23 can be achieved over the entire circumference thereof, and the whole of the reversed portion of the connecting portion 23 can be restored at a time over the entire circumference, thereby fitting the grommet into the mounting hole 12.

In the above embodiment, although the ribs 30 are formed on the inner peripheral surface of the connecting portion 23, ribs 31 (indicated in two dots-and-dash lines in FIG. 1), replacing the ribs 30, may be formed on the outer peripheral surface of the connecting portion 23.

Second embodiment

Figure 4:
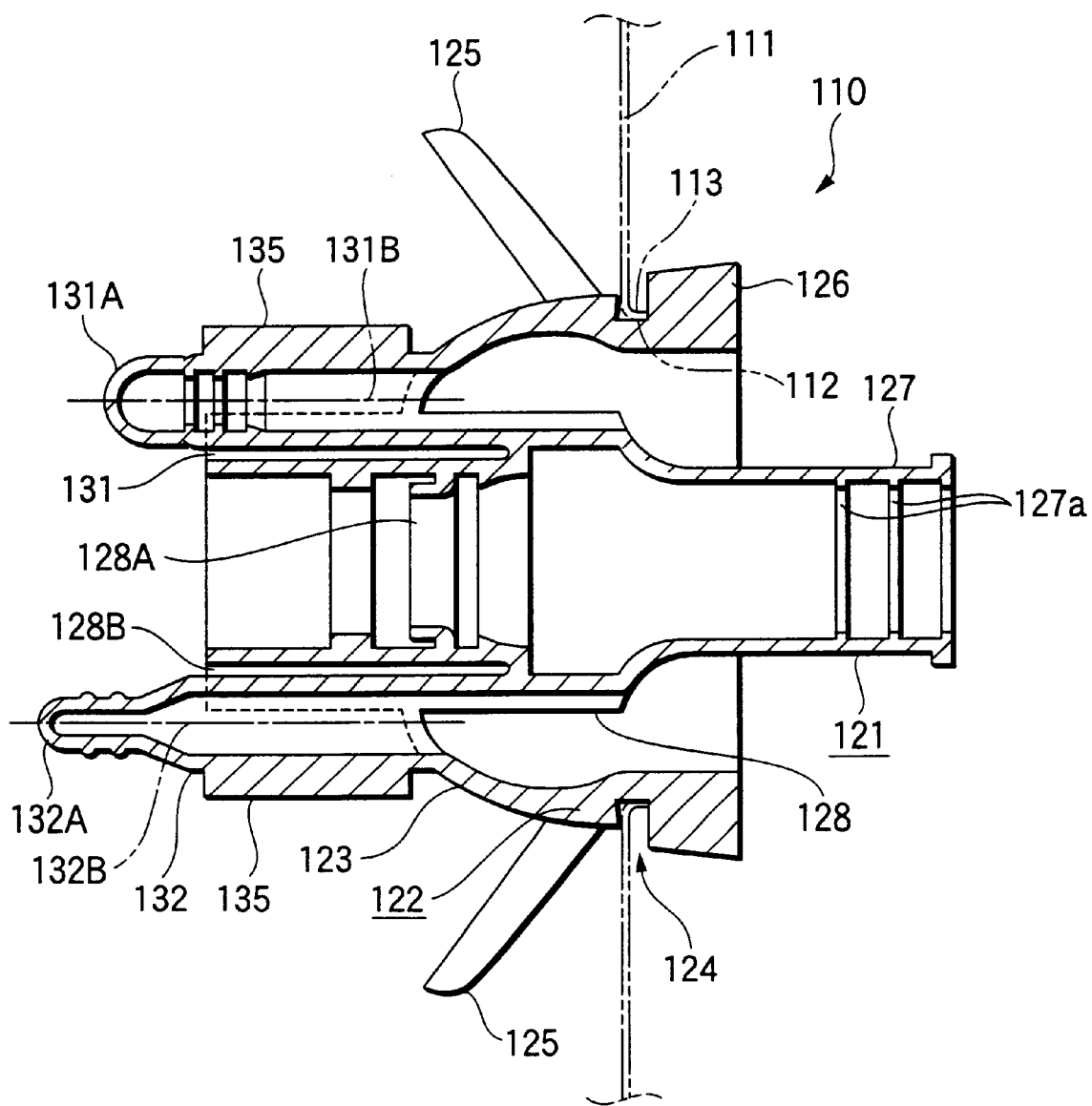
FIG. 4 is a cross-sectional view of a second embodiment of the present invention.
Figure 5:
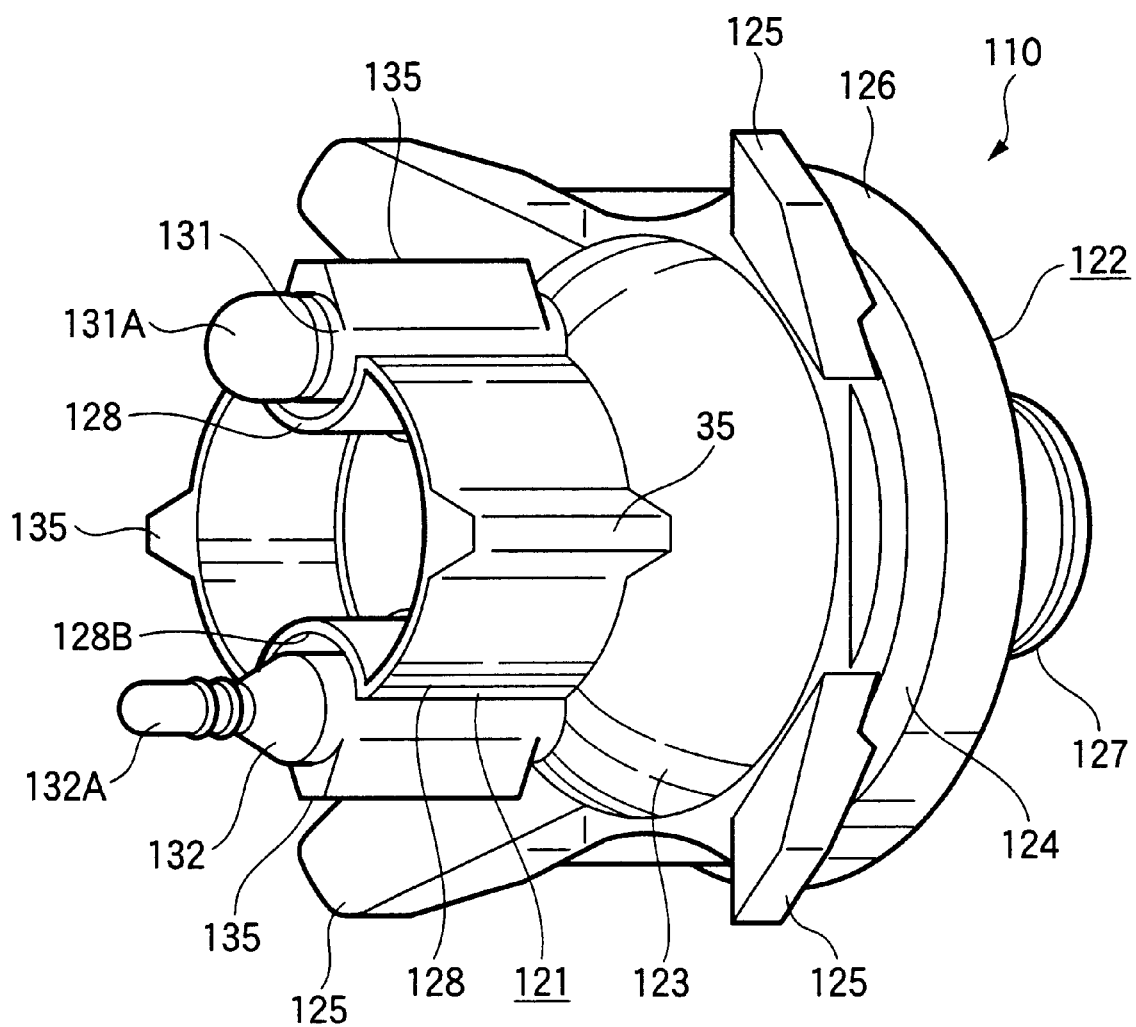
FIG. 5 is a perspective view showing the whole of a grommet of FIG. 4.

As shown in FIGS. 4 and 5, a grommet 110 of this embodiment is provided for mounting a wire harness (not shown) on a vehicle body panel 111 of an automobile in such a manner that the wire harness passes through the vehicle body panel 111, and this grommet can be fitted in a mounting hole 112, formed through the vehicle body panel 111, in such a manner that the wire harness is passed through and held relative to the mounting hole 112. The mounting hole 112 has a circular shape, and a flange 113 of a predetermined height is formed at a peripheral edge of the mounting hole 112 over an entire circumference thereof.

The grommet 110 includes a first cylindrical portion 121 for passing the wire harness therethrough, a generally-conical, annular connecting portion 123 formed on an outer peripheral surface of the first cylindrical portion 121, a second cylindrical portion 122 connected to the first cylindrical portion 121 through the connecting portion 123, a groove 124 formed in an outer peripheral surface of the second cylindrical portion 122 over an entire circumference thereof, flange portions 125 formed on that portion of the outer peripheral surface of the second cylindrical portion 122 lying between the groove 124 and the connecting portion 123, an engagement portion 126 formed on the outer peripheral surface of the second cylindrical portion 122 and extending from the groove 124 toward an open end of the second cylindrical portion 122, tubular passage portions 131 and 132, each communicating the inside and outside of the connecting portion 123 with each other, and projecting outwardly from an outer peripheral surface of the connecting portion 123, and guide portions 135 which project radially outwardly from the outer peripheral surface of the first cylindrical portion 121 with respect to the axis thereof, and can contact the peripheral edge of the mounting hole 112 in an inscribed manner. The grommet 110 is formed into an integral construction, using a synthetic resin having suitable elasticity and water-resistance.

The first cylindrical portion 121 has a stepped configuration such that it has a smaller-diameter portion 127 and a larger-diameter portion 128 formed in continuous relation to each other along a common axis.

The smaller-diameter portion 127 has an inner diameter corresponding to an outer diameter of the wire harness, and annular ribs 127A are formed on an inner peripheral surface of the smaller-diameter portion 127.

When the wire harness is press-fitted into the smaller-diameter portion 127, the ribs 127A are elastically deformed to be held in intimate contact with the outer peripheral surface of the wire harness, so that the smaller-diameter portion 127 holds the wire harness in an air-tight manner.

The larger-diameter portion 128 has an inner diameter larger than the inner diameter of the smaller-diameter portion 127, and a plurality of annular ribs 128A are formed on an inner peripheral surface of the larger-diameter portion 128. After the wire harness is press-fitted into the grommet, a predetermined filling material is filled in the larger-diameter portion 128, and is solidified, so that the larger-diameter portion 128 holds the wire harness in an air-tight manner.

The passage portions 131 and 132 are disposed on the circumference of the larger-diameter portion 128, and therefore those portions of the larger-diameter portion 128, at which the passage portions 131 and 132 are formed, respectively, are recessed inwardly so as not to interfere with the passage portions 131 and 132. Namely, the peripheral wall of the larger-diameter portion 128 are recessed inwardly at two circumferentially-spaced portions thereof to provide recessed wall portions 128B of a semi-circular cross-section, and the independent tubular passage portions 131 and 132 are provided respectively in spaces defined respectively by the outer surfaces of these recessed wall portions 128B. The connecting portion 123 has a generally uniform thickness as a whole, and this connecting portion 123 has a generally-conical, annular shape, and spreads or flares from the outer peripheral surface of the larger-diameter portion 128 toward an open end of the smaller-diameter portion 127. The independent passage portions 131 and 132 are connected at their proximal ends to the outer peripheral surface of a smaller-diameter end portion of the connecting portion 123, and communicate with the connecting portion 123. The passage portions 131 and 132 are different in diameter from each other, and are disposed respectively at two regions circumferentially spaced 180 degrees from each other. These passage portions 131 and 132 are arranged in such a manner that their axes 131B and 132B extend respectively along generatrices of the outer periphery of the first cylindrical portion 121. In this embodiment, the tubular passage portions 131 and 132 have end caps 131A and 131B formed respectively at their distal ends, and therefore each of these passage portions 131 and 132 has a so-called closed-bottom tubular shape. The end caps 131A and 132A are cut off or incised if necessary, thereby communicating the inside and outside of the connecting portion 123 with each other through the passage portions 131 and 132 so that a cable or the like can be passed through each of these passage portions.

The guide portions 135, which can contact the peripheral edge of the mounting hole 112 in an inscribed manner, are formed on and project from the outer peripheral surface of the larger-diameter portion 128, and two of these guide portions 135 are formed respectively on the outer peripheral surfaces of the passage portions 131 and 132, and extend along the passage portions 131 and 132, respectively.

The second cylindrical portion 122 has an outer diameter corresponding to the diameter of the mounting hole 112, and also has an inner diameter larger than the outer diameter of the smaller-diameter portion 127. This second cylindrical portion 122 is connected to the connecting portion 123. Therefore, this second cylindrical portion 122 is arranged in generally-telescopic relation to the smaller-diameter portion 127 such that the smaller-diameter portion 127 is received in the second cylindrical portion 122, with a predetermined space formed therebetween.

The groove 124 has a generally channel-shaped cross-section, and the flange 113, formed at the peripheral edge of the mounting hole 112, can be fitted in this groove 124. The groove 124 is formed continuously in the circumferential direction perpendicular to the axis of the second cylindrical portion 122.

The flange portions 125 are disposed adjacent to the groove 124, and have such a configuration as obtained by dividing a disk, disposed perpendicular to the axis of the second cylindrical portion 122, into four sections. These flange portions 125 are circumferentially spaced about 190 degrees from one anther, and extend radially outwardly from the second cylindrical portion 122.

Next, a procedure of installing the wire harness, using the grommet 110, will be described.

First, the wire harness (not shown) is passed through the first cylindrical portion 121 of the grommet 110, and the predetermined filling material is filled in the larger-diameter portion 128, and is solidified.

Figure 6:
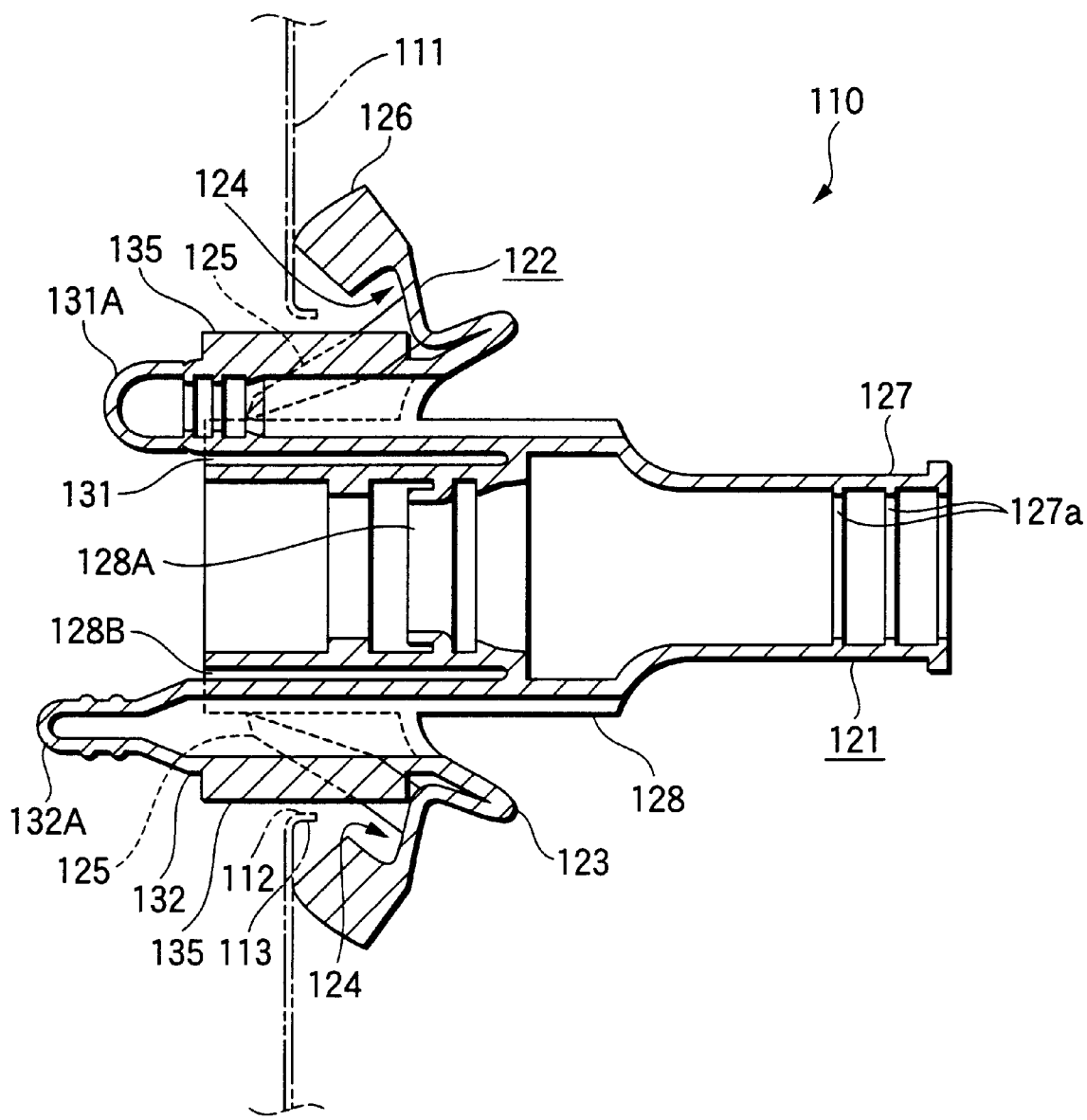
FIG. 6 is a cross-sectional view of the grommet in its reversed condition.

Then, as shown in FIG. 6, the second cylindrical portion 122 is turned or reversed toward the larger-diameter portion 128 of the first cylindrical portion 121, and therefore is turned inside out, with the inner peripheral surface of the second cylindrical portion 122 exposed outwardly.

At this time, when the second cylindrical portion 122 is reversed, the connecting portion 123 is bent or folded back at a suitable portion thereof although the passage portions 131 and 132 are connected to the connecting portion 123, and as a result, the second cylindrical portion 122 is turned inside out. In this reversed condition, the tubular passage portions 131 and 132 are not particularly deformed since these tubular passage portions 131 and 132 are independent. Therefore, in this condition, cables or the like can be passed respectively through the passage portions 131 and 132 after cutting off the end caps 131A and 132A.

Then, in this condition, the grommet 110 is arranged in such a manner that the second cylindrical portion 122 covers the flange 113 formed at the peripheral edge of the mounting hole 112, and then the wire harness, passing through the mounting hole 112, is pushed, thereby pushing the larger-diameter portion 128 of the first cylindrical portion 121 into the mounting hole 121. At this time, the wire harness will not be displaced relative to the first cylindrical portion 121 upon pushing the wire harness in a left-hand direction (FIG. 6) since the wire harness is held by the first cylindrical portion 121 through the filling material.

When the larger-diameter portion 128 of the first cylindrical portion 121 is thus pushed into the mounting hole 121, the peripheral edges (distal ends) of the flange portions 125 on the reversed second cylindrical portion 122 are inserted into the mounting hole 112, and the engagement portion 126, disposed radially outwardly of the flange portions 125 through the groove portion 124, abuts against that portion of the panel 111 around the peripheral edge of the mounting hole 112.

Then, when the wire harness is further pushed in the left-hand direction in the drawings, the second cylindrical portion 122 is turned outwardly (that is, in such a direction as to be restored into its initial condition) about the distal end of the engagement portion 126 abutted against the vehicle body panel 111. When this turning movement exceeds a critical point, the grommet 110 itself begins to produce its restoring force, and the second cylindrical portion 122 and the connecting portion 123 tend to be restored into their respective initial shapes by themselves, and the flange portions 125 are turned in sliding contact with the peripheral edge of the mounting hole 112, and because of a guiding action of the turning flange portions 125, the groove 124 is fitted on the peripheral edge of the mounting hole 112.

The present invention is not limited to the above embodiment, and various modifications and improvements can be made, and the material, shape, dimensions, form, number, arrangement and so on of the mounting plate, the mounting hole, the first cylindrical portion, the connecting portion, the second cylindrical portion, the groove, the flange portions, the engagement portion, the ribs and so on, described in the above embodiment, may be arbitrary, and are not limited in so far as the present invention can be achieved.

As described above, in the present invention, there are provided the ribs which extend continuously from the smaller-diameter end of the connecting portion toward the larger-diameter end thereof to the predetermined position. Therefore, when the grommet is turned inside out so as to be mounted on the panel, the position, at which the connecting portion is folded, is determined by the ribs. As a result, the connecting portion will not be folded at the proximal end thereof, but is folded at that portion thereof (intermediate the opposite ends thereof) near to the second cylindrical portion, and therefore the grommet can be kept in a configuration analogous to the configuration which the grommet assumes immediately before the grommet begins to be restored into its initial shape by its own restoring force. Therefore, for mounting the grommet in the mounting hole in the panel, the restoration of the grommet into its initial shape by itself can be immediately started, and the movement of the grommet from an excessively-reversed condition to the condition immediately before the initiation of the restoration, as required in the conventional construction, is not necessary, and the grommet can be smoothly fitted into the mounting hole.

In the present invention, the first cylindrical portion is disposed within the second cylindrical portion, and the ribs are formed on the inner peripheral surface of the connecting portion, and are connected to the outer peripheral surface of the first cylindrical portion. Therefore, the ribs not exposed to the exterior, and will not hinder the mounting operation. And besides, when the grommet is turned inside out, the position, at which the connecting portion is reversed or folded, is determined by the tension of the ribs, and therefore the effect of determining the position of reversal or folding of the connecting portion can be fully achieved without the need for increasing the thickness of the ribs.

In the present invention, there are provided the plurality of ribs, and the plurality of ribs are arranged radially with respect to the axis of the connecting portion. Therefore, when the grommet is turned inside out, the uniformly-reversed condition of the connecting portion can be achieved over the entire circumference thereof, and the whole of the reversed portion of the connecting portion can be restored at a time over the entire circumference, thereby fitting the grommet into the mounting hole.

Further, the reversal-type grommet of the invention has the tubular passage portion in addition to the first cylindrical portion for passing the elongate member (such as a wire harness) therethrough, and this tubular passage portion is formed on the connecting portion interconnecting the first and second cylindrical portions. Therefore, an additional elongate member, such as a cable and a hose, can be passed through this passage portion. And besides, the passage portion is in the form of an independent tubular portion, and the axis of the passage portion extends along a generatrix of the outer periphery of the first cylindrical portion. Therefore, when the second cylindrical portion is reversed or turned inside out to be fitted over the first cylindrical portion, the second cylindrical portion will not interfere with the passage portion and other portions, and therefore the second cylindrical portion can be positively reversed. And besides, the passage portion is in the form of an independent tubular portion, and therefore in the reversed condition of the second cylindrical portion, the cable or the like can be passed through the passage portion from the rear side.

In the present invention, there are provided the guide portions which can contact the peripheral edge of the mounting hole in an inscribed manner. Therefore, the first cylindrical portion can be inserted into the mounting hole in such a manner that the first cylindrical portion is automatically brought into alignment with the mounting hole. One of the guide portions is formed on the outer peripheral surface of the passage portion, and extends therealong, and therefore the passage portion is reinforced, and besides the arrangement of the guide portion and the passage portion can be easily effected.

What is claimed is:

1. A grommet for enabling an elongate member to be passed through and held relative to a mounting hole formed in a mounting plate, comprising:

a first cylindrical portion for passing the elongate member therethrough;

a generally-conical annular connecting portion formed on an outer peripheral surface of said first cylindrical portion;

a second cylindrical portion, connected to said first cylindrical portion through said connecting portion and which is turnable so as to expose an inner peripheral face thereof outwardly;

a groove formed in an outer peripheral surface of said second cylindrical portion; and a flange portion lying between said groove and said connecting portion on the outer peripheral surface of said second cylindrical portion, and a rib formed along a generatrix of said connecting portion, and extending continuously from a smaller-diameter end of said connecting portion toward a larger-diameter end thereof to a predetermined position; in which said first cylindrical portion is disposed within said second cylindrical portion, and said rib is formed on an inner peripheral surface of said connecting portion, and is connected to the outer peripheral surface of said first cylindrical portion.

2. A grommet according to claim 1, in which a plurality of said ribs are provided, and said plurality of ribs are arranged radially with respect to an axis of said connecting portion.

3. A grommet for enabling an elongate member to be passed through and held relative to a mounting hole formed in a mounting plate, comprising:

a first cylindrical portion for passing the elongate member therethrough;

a generally-conical, annular connecting portion formed on an outer peripheral surface of said first cylindrical portion;

a second cylindrical portion, connected to said first cylindrical portion through said connecting portion and which is turnable so as to expose an inner peripheral face thereof outwardly;

a groove formed in an outer peripheral surface of said second cylindrical portion; and a tubular passage portion communicating the inside and outside of said connecting portion with each other, and projecting outwardly from an outer peripheral surface of said connecting portion, said tubular passage portion having an axis extending along a generatrix of the outer periphery of said first cylindrical portion; and a plurality of guide portions projecting radially outwardly from the outer peripheral surface of said first cylindrical portion with respect to an axis of said first cylindrical portion, and contacting the peripheral edge of said mounting hole in an inscribed manner, and one of said guide portions formed on an outer peripheral surface of said passage portion, and extending along said passage portion.

* * * * *